July 12, 1932.   A. PANSKI   1,867,326
APPARATUS FOR EXTRACTING FATS AT LOW TEMPERATURE
Filed Jan. 9, 1928
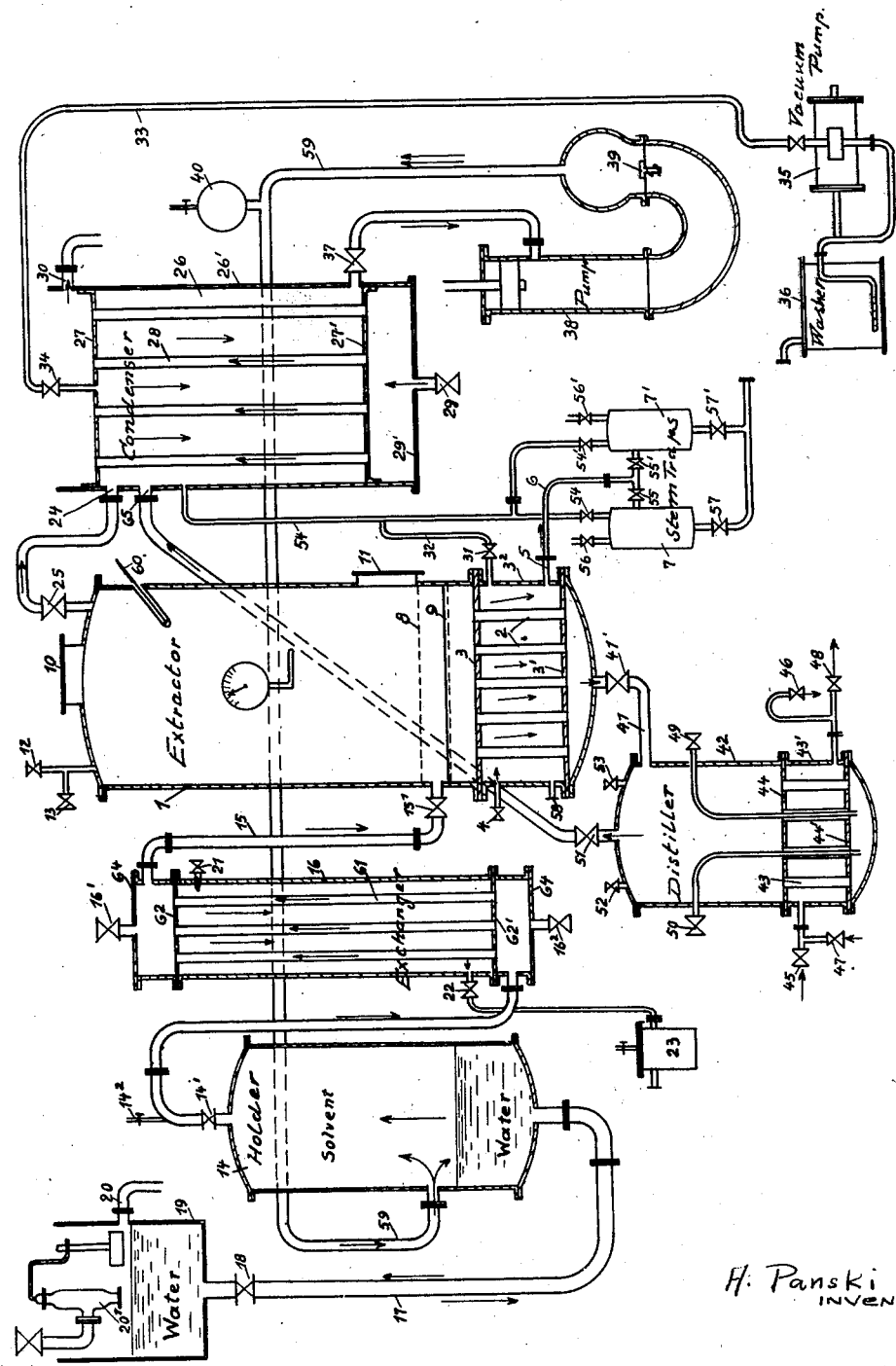
H. Panski
INVENTOR
By Marks & Clew
ATTYS.

Patented July 12, 1932

1,867,326

UNITED STATES PATENT OFFICE

ADOLPHE PANSKI, OF PARIS, FRANCE

APPARATUS FOR EXTRACTING FATS AT LOW TEMPERATURE

Application filed January 9, 1928, Serial No. 245,529, and in France May 18, 1927.

My present invention has for its object a method and a device for extracting fat and moisture from bones and such like materials under reduced atmospheric pressure and consequently at low temperature by means of a comparatively simple apparatus most parts of which are at the same level whereby supervision is made easy.

According to my invention a current of solvent vapor is caused to pass through the bones to be treated, the liquid solvent remaining out of contact with the said material being vaporized at reduced atmospheric pressure and low temperature through the action of a vacuum kept up by a condenser. The solvent vapors arriving against the fat bearing material are partly condensed, dissolving fat which collects at the bottom of the extractor for further recovery of the fat from the solvent-fat solution.

In order to prevent at the beginning of operation, when the extractor and the material to be treated are filled with air, the solvent vapors from mixing with said air and from being drawn along by it in form of an uncondensable vapor mixture, I prefer to evacuate all air from the extractor and the material to be treated at the beginning of operation, the vacuum is kept up later solely by the liquefying and cooling action of the condenser.

In order to obtain a rapid and smooth vaporization of the liquid solvent entering the extractor, said solvent is heated to near its boiling point corresponding to the degree of vacuum prevailing in the extractor by the passage through a heat exchanger. The heating steam vaporizing the solvent in the extractor is of a less than atmospheric pressure and its temperature is slightly above the boiling point of the vaporized solvent.

The mixed vapors of solvent and water passing from the extractor into the shell of the condenser are liquefied along the inside with water cooled tubes, the liquefied solvent and water cooling further on their down flow whereby their vapor tension is considerably reduced resulting in a high vacuum.

In the condenser liquefied and cooled vapors are pumped in a solvent holder wherein the solvent separates automatically from the water and displaces from the said holder an equivalent volume of water flowing back to the water tank feeding the said holder.

The fat containing solvent collected at the bottom of the extractor is sent to a distiller where it is freed from the solvent by vaporization in high vacuum through the action of the condenser, by means of a steam heated device and by direct low pressure steam bubbling through the fat, which is removed from the distiller under vacuum by blowing out with steam.

Three runs of solvent-fat solution from the extractor to the distiller are generally required for the complete extraction of fat from the material to be treated. The last fat solution is run off from the extractor when the solvent vapors passing from the extractor to the condenser are free from water vapors, ascertained by a reached constant maximum temperature of said solvent vapors shown by a thermometer disposed near the outlet of vapors from the extractor. The temperature of the solvent vapors in presence of water vapors being depressed.

My invention may be executed in a plant comprising:

A—An extractor provided at a certain height above its bottom with a perforated grating supporting the material to be treated and a second perforated grating covered with a canvas below the upper grating for holding back all dust and meal falling through the upper grating, a steam-chest disposed below the lower grating, consisting of a bundle of vertical tubes held by two tube plates and surrounded by a shell, low pressure steam passing around the tubes, the steam-chest provided with a safety valve blowing off when steam reaches atmospheric pressure, a steam inlet and air outlet connected to the condenser, an outlet for condensed steam connected to two steam traps adapted to work under vacuum.

B—A tubular condenser with insides water cooled tubes connected with the top of the extractor and at its lower end with a plunger pump, consisting of a bundle of vertical tubes held by two horizontal tube plates surrounded by a shell the vapors entering the shell condense and cool flowing down at the outside of the tubes. A bottom is disposed below the lower tube plate provided with a water inlet, the water rising inside the tubes and overflowing over the top of the tubes, the cool liquid solvent and water flow and collect over the lower tube plate and are removed by the plunger pump, the upper tube plate is provided with a tube connected to a vacuum pump extracting the air of the shell of said condenser, the shell is provided at its upper end with two solvent vapor inlets and one air inlet from the heating device of the extractor and its two steam traps.

C—A plunger piston pump connected with its suction pipe to the solvent outlet of the condenser and with its delivery pipe to the sovent holder, said plunger pump is provided with one spring valve and an air container on the delivery pipe for damping the water hammer effect.

D—A fat distiller connected with the lower part of the extractor provided at its lower end with a steam chest, consisting of a bundle of vertical tubes held by two superposed tube plates and surrounded by a shell, low pressure steam for vaporizing solvent from fat, or cold water for generating a high vacuum are passing around the tubes, the said shell is provided with a steam inlet, a cold water inlet, a warm water outlet and condensed water outlet. Below the steam chest is a bottom closing the distiller, at the upper end a solvent vapor outlet connected to the condenser, an air outlet and a steam inlet. The distiller is further provided with two vertical plunging tubes passing through the vertical heating tubes and reaching nearly the bottom of the distiller, steam enters through one plunging tube bubbling through the fat solution, the exhausted fat is forced out of the distiller through the other plunging tube.

E—A solvent holder sealed at its lower end by water, acting as a water piston connected to a constant level water tank for preventing an air influx in the holder, the water displacing the solvent from the holder through the heat exchanger into the extractor, solvent returned by the plunger pump to the holder expulses an equivalent volume of water forced back to the water tank wherefrom it overflows, the solvent is at no moment in contact with the air.

F—A heat exchanger consisting of a bundle of vertical tubes held by two horizontal superposed tube plates surrounded by a shell, two further shells are provided, one above the upper tube plate provided with a top lid, an air outlet tube and a solvent outlet tube to the extractor, the other below the bottom tube plate provided with a bottom lid with a water outlet tube and a solvent inlet tube from the holder. The steam chest is provided with a steam inlet, the steam heating the outside of the tubes, the solvent rising inside the tubes and is heated, a condensed steam outlet connected to a steam trap.

A form of execution of my invention is shown by way of example on appended figure.

The apparatus comprises: an extracting vessel 1, the heating chamber of which consists of vertical tubes 2 held between two horizontal superposed tube plates 3 and 3' surrounded by a shell $3^2$. The tubes 2 are heated on the outside by steam entering the shell through tube 4, steam condensed in the shell $3^2$ is exhausted through tubes 5 and 6 in the steam trap 7 or 7'. The air contained in the heating steam is sucked off through the tubes 31, 32 and 54 by the condenser. The safety valve 58 prevents the heating steam of rising above atmospheric pressure.

Two perforated horizontal superposed plates 8 and 9 are disposed above the steam chest in extractor 1; the lower plate 9 is covered with a canvas preventing dust and meal from falling inside the tubes 2, which diminishes the heating surface of said tubes.

The extractor 1 is provided with two manholes 10 and 11 for loading and unloading, a steam inlet 12 and an air inlet 13, a solvent vapor outlet 25 and a thermometer 60.

The condenser 26 consists of a bundle of vertical tubes 28 held by two horizontal superposed tube plates 27 and 27' surrounded by a shell 26' closed up by a bottom 29' provided with a cold water inlet 29. The condenser shell 26' is provided near the top with two solvent vapor inlets 24 and 65 and an air inlet 54, near the lower tube plate 27' with a solvent outlet 37. The cooling water rises inside the tubes 28 and overflows through tube 30. The upper tube plate 27 is provided with a tube 34 connected by a pipe 33 with a vacuum pump 35 extracting air from the condenser shell 26'. The plunging piston pump 38 sucks the solvent condensed in 26' through tube 37 and forces it through the spring valve 39 in the delivery pipe 59 provided with an air vessel 40 into the holder 14.

The fat containing solvent is caused to flow from the extractor 1 through pipe 41 to the distiller 42 provided with a steam chest consisting of a bundle of vertical tubes 43 held by two horizontal superposed tube plates 44 and 44' surrounded by the shell 43', the tubes 43 are heated on the outside by steam entering through the cock 47 and the condensed steam is exhausted through the cock 48, the tubes 43 are cooled on the outside by cold water entering through the cock 45 and overflowing through the cock 46 submerging the tubes 43 under water. The fat is freed from last traces of adherent solvent by steam entering through the pipe 49 bubbling through the fat and the fat is expelled from the distiller 42 under vacuum by steam entering through the pipe 52 passing through the plunging pipe 50. The distiller 42 is connected by the pipe 41 to the bottom of extractor 1 and by the pipe 57 to the top of condenser 26. The solvent contained in holder 14 enters the extractor 1 in opening the valve 14' and the valve 15 flowing through the pipe 14' to the lower end of the heat exchanger 16 and rises inside the tubes 61 is caused to enter the extractor 1 without rising above the perforated plate 9. The solvent in holder 14 is sealed at its lower end by a water seal acting as water piston; outflowing solvent is replaced by an equivalent volume of inflowing water from tank 19 through the valve 18 and the pipe 17; the outflowing water from tank 19 is replaced by a water influx through the valve 20'. The solvent pumped back in the holder 14 through the pipe 59 returns an equivalent volume of water to the tank 19 which overflows through the tube 20. No contact of solvent with the air is possible. The solvent in said holder 14 is above or below the water seal according to its specific gravity. The air is released from holder 14 through the cock 14² and the air from the heat exchanger 16 is released through the cock 16', water separated from the solvent in the heat exchanger 16 is released through the cock 16².

Each of the steam traps 7 and 7' is connected by a pipe with the cocks 55 and 55' receiving alternatively condensed steam from the steam chest 3² of the extractor 1, said traps are connected by the cocks 54 and 54' and by the pipe 54 to the condenser 26, life steam is admitted into the trap 7 or 7' through the cock 56 or 56' forcing out the accumulated water through the cock 57 or 57'.

The apparatus is working as follows:

The fat bearing material is fed through the manhole 10 in the extractor 1 and is supported by grating 8, the manholes 10 and 11 are tightly closed and the valves 25 and 34 are opened, the vacuum pump removes through the tube 33 the air contained in the condenser 26 in the extractor 1 and in the therein loaded material as completely as possible; the cock 14' on holder 14 and the cock 15' are then opened, solvent entering the extractor 1 until its level reaches the lower plate 9, being suitably heated by its passage through the tubes 61 of the exchanger 16 by steam admitted through the tube 21. The solvent is vaporized in the tubes 2 of vessel 1 by steam heating the outside of the tubes 2 entering through the tube 4, the air contained in the heating steam is not allowed to accumulate in the steam space around the tubes 2 and is sucked off by the condenser 26 through the pipe 32 and 54, the steam pressure being kept below the atmospheric pressure inside the steam chest, no violent boiling and projection of masses of solvent-fat solution out of the tubes 2 against the material to be treated is possible. The safety valve 58 on the shell 3² is blowing off if the steam pressure therein rises above atmospheric pressure, the condensed steam is exhausted from the steam chest through the tube 5 and the pipe 6 alternatively in the steam trap 7 or 7' previously set under vacuum; each trap is cut off and replaced when full with water by the other, the change over being made by turning the cocks 55 or 55'. The water contained in the steam trap is forced out by a steam jet entering through the cocks 56 or 56' and is discharged through the cocks 57 or 57', the cocks 56 or 56' and 57 or 57' are then closed and the valve 54 or 54' is opened, the steam left in the respective trap is sucked off by the condenser 26 and the trap set under vacuum, ready to receive the following charge of condensed steam. As soon as solvent and water vapors are passing through the cock 25 and the pipe 24 from vessel 1 into the condenser 26, the thermometer disposed near the valve 25 indicates a temperature rise, the vacuum pump is then stopped and a continual high vacuum is kept up by the condensing and cooling action of the condenser 26. The vacuum pump 35 is reset working when the vacuum owing to possible air leaks in the apparatus begins to fall, the sucked off air mixed with some solvent is discharged in the washer 36. Then inside the vessel 1 condensed solvent vapors having dissolved fat flow and collect at the bottom of said vessel 1 and when sufficiently saturated with fat is run off through the cock 41' and the pipe 41 into the distiller 42, the cock 41 is then closed and fresh solvent is readmitted in the vessel 1. The distiller 42 before receiving the solvent-fat solution is set under vacuum similar to the vacuum prevailing in vessel 1, by blowing out with steam entering the distiller 42 through the plunging pipe 49 all the air which escapes mixed with vapor through the tube 53, the cocks 49 and 53 are then closed and cold water enters the steam chest of said distiller through the cock 45 rising outside the vertical tubes 43 and overflowing as warm water through the cock 46, the steam chest of said distiller acting now as a condenser, a high vacuum is rapidly established.

The cooling water left in the steam chest of the distiller 42 is run off through the cock 48, valve 51 leading to the condenser is opened, by opening valve 47 steam enters the chest of said distiller heating now the outside of the tubes 43 and evaporating most of the solvent contained in the fat solution, the solvent vapors enter the condenser 26 through pipe 51 and are condensed there with the vapors passing from vessel 1.

The condensed solvent and water in condenser 26 collecting above the tube plate 27' are pumped out through the cock 37 by the plunger pump 38, the piston forcing the liquid through the spring valve 39 in the pipe 59, the air container 40 damping the piston strokes of the pump, the solvent and water being forced in the holder 14 where solvent and water separate automatically by gravity, the entering solvent in holder 14 discharges an equivalent volume of water from it flowing through the pipe 17 and cock 18 in the tank 19 where it overflows through the pipe 20.

The last traces of solvent adhering to the fat distilled in the distiller 42 are vaporized by steam entering through the plunging pipe 49 bubbling through the fat. The solvent free fat is forced out from the said distiller through the plunging pipe 50 by steam entering through the tube 52. The distiller 42 is then set again under vacuum by cooling the vertical tubes 43 with cold water in the said manner, for receiving a following charge of solvent-fat solution.

When the last solution of fat was caused to pass from extractor 1 in the distiller 42 the cocks 41' and 51 are left open the cock 25 connecting the extractor 1 with the condenser 26 is closed and the steam valve 12 is opened, the entering steam vaporizes the solvent impregnating the extracted material, the vapors pass through pipe 41 and the pipe 51 and are condensed in the condenser 26. The extracted dry material is free from solvent when the solvent level in the holder 14 remains stationary. The cocks 12 and 41 are then closed and air is allowed to enter the extracting vessel 1 through the cock 13. The dry extracted material is discharged through the manhole 11. In my improved process and apparatus two devices only, the extractor and the condenser are kept under continual vacuum.

What I claim is:

An apparatus for extracting fats from animal and vegetable raw materials by solvent vaporized at low temperature, comprising a closed extractor, two perforated superposed gratings therein, the upper grating supporting the raw material and the lower grating supporting a filtering canvas, a steam chest in the lower part of the extractor, a condenser consisting of a bundle of vertical inside watercooled tubes surrounded by a vapor chest for condensing and cooling the solvent vapors, means for connecting the extractor-top with the condenser chest to maintain inside the extractor a pressure below the atmospheric pressure and a low temperature, means for connecting the steam chest of the extractor with the chest of the condenser to maintain the steam chest below atmospheric pressure and at a low temperature, a safety valve connected to the steam chest to prevent the steam pressure exceeding atmospheric pressure, vacuum steam traps connected to the steam chest to remove the condensed water therefrom, a still for distilling the extracted fat, a steam chest at the lower part of the still, means for connecting the upper part of the still with the chest of the condenser to maintain in the still a less than atmospheric pressure and a low temperature, means for filling the still with steam and blowing out the air therefrom, means for condensing the steam in the still by cold water circulation in the steam chest of the still to maintain a high vacuum therein, a solvent holder sealed by water for preventing an air contact with the solvent, means for connecting the bottom of the solvent holder with a higher placed constant level water tank for separating the water from the solvent and for displacing solvent from the holder, a conduit connecting a plunger pump with the solvent holder, a conduit connecting the bottom of the condenser chest with the plunger pump, a heat exchanger interposed between the holder and the extractor for preheating the solvent and removing therein separated water.

In testimony whereof I have affixed my signature.

ADOLPHE PANSKI.